Figures 1, 2:
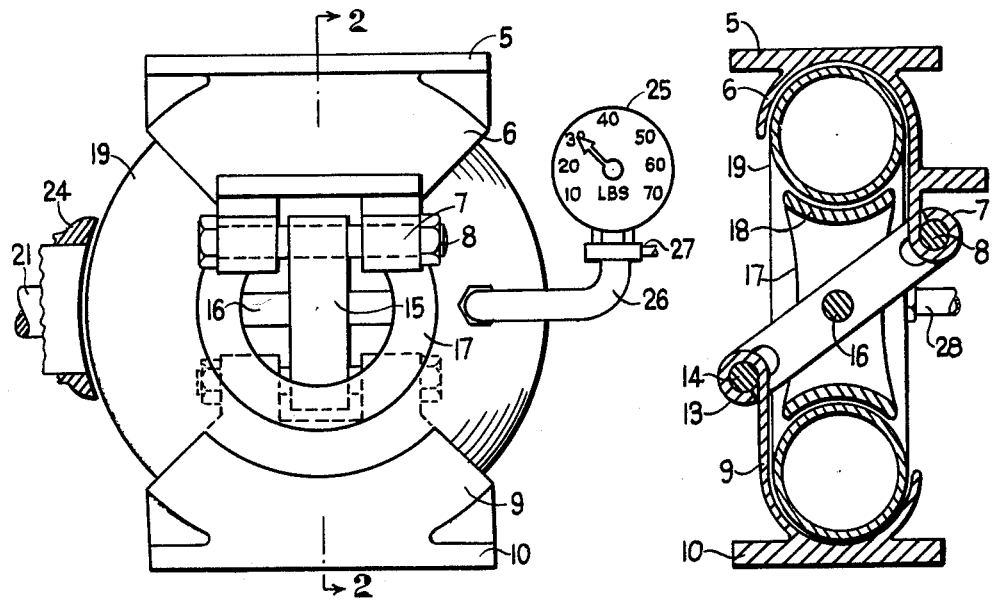

INVENTOR.
Robert S. Leonard.

United States Patent Office 3,156,458
Patented Nov. 10, 1964

3,156,458
PNEUMATIC SUSPENSION SYSTEM FOR AUTOMOTIVE VEHICLES
Robert S. Leonard, 601 Belden Ave., Chicago, Ill.
Substituted for abandoned application Ser. No. 251,221, Jan. 14, 1963. This application May 22, 1964, Ser. No. 371,871
4 Claims. (Cl. 267—65)

This invention relates to automotive vehicles, and more particularly to a suspension system for use on automotive vehicles and the like.

Although many useful improvements have been made on nearly every component of automotive vehicles, no improvement is as much needed as one to replace the usual springs of a car. The reason for this need of an improved suspension system is not only for reasons of comfort, but the even more important reason of safety, for not only the occupants of the vehicle, but safety to everyone within sight of the machine which can at any moment become an instrument of death for all concerned, as well as for innocent bystanders and the like.

It is, therefore, an object of this invention to provide a suspension system for automotive vehicles and the like that operates on pneumatics or hydraulics.

Another object of this invention is to provide a pneumatic suspension system for automotive vehicles that has its buoyancy controlled by the terrain over which it, the vehicle, is riding.

Another object of this invention is to provide a pneumatic suspension system for automotive vehicles that eliminates the use of springs in any form whatsoever. Springs are nearly always the weak link in any mechanism.

Another object of this invention is to provide a pneumatic suspension system for automotive vehicles that stops front end dive and rear end sag as well as side sway on curves, all of which not only increase the wear on certain parts of the vehicle, but provides an uncomfortable ride as well.

Still another object of this invention is to provide a pneumatic suspension system for automotive vehicles that can also be adapted to operate on a combination of pneumatics and hydraulics if so desired.

From the preceding, it is seen that the invention has as its objects, among others, the provision of a pneumatic suspension system for automotive vehicles of the character described which is of simple and economical construction and which can be employed to meet the requirements indicated above. Other objects of the invention will become apparent from the following description.

Figure 3:
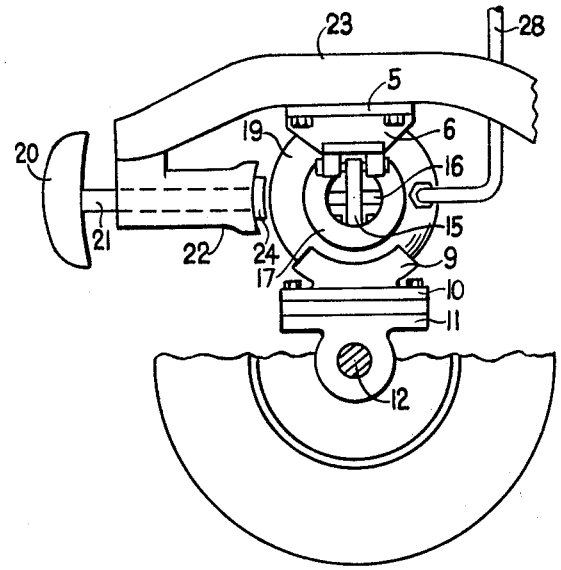

Referring to the drawings for a more detailed description:

FIGURE 1 is a side view of this invention.
FIGURE 2 is a sectional view of this invention taken along line 2—2 of FIGURE 1.
FIGURE 3 is a side view of this invention installed on an automotive vehicle.

Similar reference characters refer to similar parts throughout the several views of the drawing.

Having reference now to the drawing in detail, there is generally indicated by the character 5 a plate that is fastened to the underside of an automotive vehicle. The plate is integral with the top saddle 6 that has one edge 7 encompassing a shackle bolt 8 while a like saddle 9 is integral with the bottom plate 10 that is bolted to the fitting 11 which encompasses the axle 12 of an automotive vehicle. The saddle 9 has one edge 13 encompassing the shackle bolt 14 that is located on the opposite side of this invention and below the previously mentioned shackle bolt 8, as is clearly shown in FIGURE 2 of the appended drawing. The aforesaid edges 7 and 13 of the saddles 6 and 9 are U-shaped when viewed from the front in order to provide a recess for the reception of the ends of the shackle bar 15, in which is centrally located and swingably mounted a fulcrum pin 16 which has each end terminating in what I personally call the hub 17, which has a side configuration of an annular body, which when viewed in section as in FIGURE 2 of the appended drawing, has its external periphery 18 contoured around an elastic member in shape of a torus 19 that is nested between the top saddle 6 and the bottom saddle 9.

Looking now at FIGURE 3 of the appended drawing, it will be seen that this novel invention of mine is so mounted on the vehicle that the bumper (front or rear) 20 is mounted on one end of a horizontally disposed rod 21 that is slidably mounted in a housing 22 that is secured to the frame 23 of the vehicle. The horizontally disposed rod 21 is provided with a stop 24 that has one surface concaved to the external surface of the aforesaid elastic member 19, thereby providing a means of resiliency to the bumper 20 of the vehicle should the same ever be struck by, or run into, a resisting object.

I have now described my invention of a pneumatic suspension system for automotive vehicles in its basic form, with the exception of stating that a check gage 25 may be connected to the elastic member 19 (by a pipe 26) which is inflated with either air or hydraulic fluid, according to the requirements of the vehicle's manufacture. The check gage 25 is provided with a check valve 27 for reasons of safety, while the elastic member receives its fluid, air or hydraulic, through an intake pipe 28. The check gage 25 is now shown in FIGURES 2 and 3 of the appended drawing since it may be located in any desired place on the vehicle.

As a vehicle having this invention mounted thereon moves over any rough surface, such as a roadway, the top saddle 9 will push down on the shackle bar 15 across the fulcrum pin 16, thereby forcing the bottom saddle 9 upward, causing the hub 17 to rise up and come down on a cushion of compressed air or other fluid in the elastic member 19, which I call a pneumatic buoy, which is located between the top saddle 6 and bottom saddle 9, which I have previously described in detail, thus reducing shock and vibration. In case of a collision from the front or rear, the bumper stop 24 will be forced against a cushion of compressed air or hydraulic fluid in the elastic member 19, thereby reducing the impact.

As many embodiments may be made of this inventive concept, and as many modifications may be made in the embodiment hereinbefore shown and described, it will be understood that all matter herein is to be interpreted merely as illustrative, and not in a limiting sense.

In accordance with the provisions of the United States patent statutes, as stated in the United States Code Title 35, patents, I have now described the principle of construction and operation of my invention of a pneumatic suspension system for automotive vehicles in the form which I personally consider the best embodiment thereof, and what I now claim as my invention and desire to secure by Letters Patent is:

1. An invention of the character described, comprising a fluid filled elastic member in shape of a torus resting upon a saddle, having a flat plate secured to an axle on an automotive vehicle and a second saddle diametrically opposite the first mentioned saddle, the second saddle, having a flat plate secured to the underside of the frame of the said automotive vehicle and structure connecting the two saddles, by means of a shackle bar, to a hub located within the confines of the said elastic member, thereby providing a pneumatic suspension system for automotive vehicles.

2. An invention of the character described, comprising a fluid filled elastic member in shape of a torus resting upon a saddle, having a flat plate secured to an axle on an automotive vehicle and a second saddle diametrically opposite the first mentioned saddle, the second saddle, having a flat plate secured to the underside of the frame of the said automotive vehicle and structure connecting the two saddles, by means of a shackle bar, to a hub having a side configuration of an annular body, the said hub being located within the confines of the said elastic member, thereby providing a pneumatic suspension system for automotive vehicles.

3. An invention of the character described, comprising a fluid filled elastic member in shape of a torus resting upon a saddle, having a flat plate secured to an axle on an automotive vehicle and a second saddle diametrically opposite the first mentioned saddle, the second saddle, having a flat plate secured to the underside of the frame of the said automotive vehicle and structure connecting the two saddles, by means of a shackle bar, to a hub having a side configuration of an annular body, the said hub being located within the confines of the said elastic member, and piping connecting the said elastic member with the fluid system of the said automotive vehicle, thereby providing means of keeping the said elastic member inflated to a predetermined pressure, thereby providing a pneumatic suspension system for automotive vehicles.

4. An invention of the character described, comprising an elastic member in shape of a torus inflated with a fluid from the fluid system of an automotive vehicle to a predetermined pressure, and a saddle having a flat plate integral therewith, the said saddle encompassing in part the said elastic member upon which it rests and a second saddle also having a flat plate integral therewith, and the second said saddle also encompassing in part the said elastic member, the two saddles being vertically diametrically opposite one another, and a hub in the form of an annular body inserted centrally within the confines of the said elastic ring and a rectangular shackle bar swingably mounted on a centrally located fulcrum pin having each end secured centrally to the said hub while one outer end of the said rectangular shackle bar is secured by a shackle bolt, a downwardly extending edge of the first mentioned saddle and the other end of the same shackle bar is secured by a shackle bolt to the upwardly extending edge of the second mentioned saddle, the saddles being mounted between the underside of the frame of an automotive vehicle and the axle of the same vehicle by resting upon the plate of each saddle and a check gage and valve connected to the said elastic member thereby providing means of control of the fluid pressure within the said elastic member that provides a pneumatic suspension system for the said automotive vehicle.

References Cited by the Examiner

UNITED STATES PATENTS

| 1,341,407 | 5/20 | Armory | 267—65 |
| 2,790,634 | 4/57 | Fanwick | 267—65 |

FOREIGN PATENTS

| 19,218 | 8/08 | Norway. |

ARTHUR L. LA POINT, *Primary Examiner.*